United States Patent [19]

Mischler et al.

[11] 4,255,684
[45] Mar. 10, 1981

[54] LAMINATED MOTOR STATOR STRUCTURE WITH MOLDED COMPOSITE POLE PIECES

[76] Inventors: William R. Mischler, Schenectady, N.Y.; General Electric Company, 02, Schenectady, N.Y.

[21] Appl. No.: 63,129

[22] Filed: Aug. 3, 1979

[51] Int. Cl.³ .......................... H02K 1/00; H02K 1/04
[52] U.S. Cl. .................................. 310/216; 310/217; 310/218; 310/43; 310/254; 310/259
[58] Field of Search ....................... 310/42-44, 310/216-218, 254, 259

[56] References Cited

U.S. PATENT DOCUMENTS

| | | | |
|---|---|---|---|
| 794,998 | 7/1905 | Mott | 310/216 X |
| 1,255,606 | 2/1918 | Hensley | 310/216 X |
| 1,255,607 | 2/1918 | Hensley | 310/217 X |
| 2,433,390 | 12/1947 | Packer | 310/44 X |
| 3,591,819 | 7/1971 | Laing | 310/259 X |
| 3,953,754 | 4/1976 | Hallerback | 310/43 X |

*Primary Examiner*—Mark O. Budd
*Attorney, Agent, or Firm*—Donald R. Campbell; Marvin Snyder; James C. Davis

[57] ABSTRACT

Stator structures are fabricated using strip material and moldable magnetic composite, either amorphous metal tape and amorphous flake or similar conventional materials. The laminated core is assembled from identical core sections constructed of nested layers of flat strip, and the moldable material forms the pole pieces after insertion of the coils. Alternately, the pole pieces are produced by bending the laminated tape structure. Shading coils may be added to realize an easily assembled shaded pole motor.

5 Claims, 9 Drawing Figures

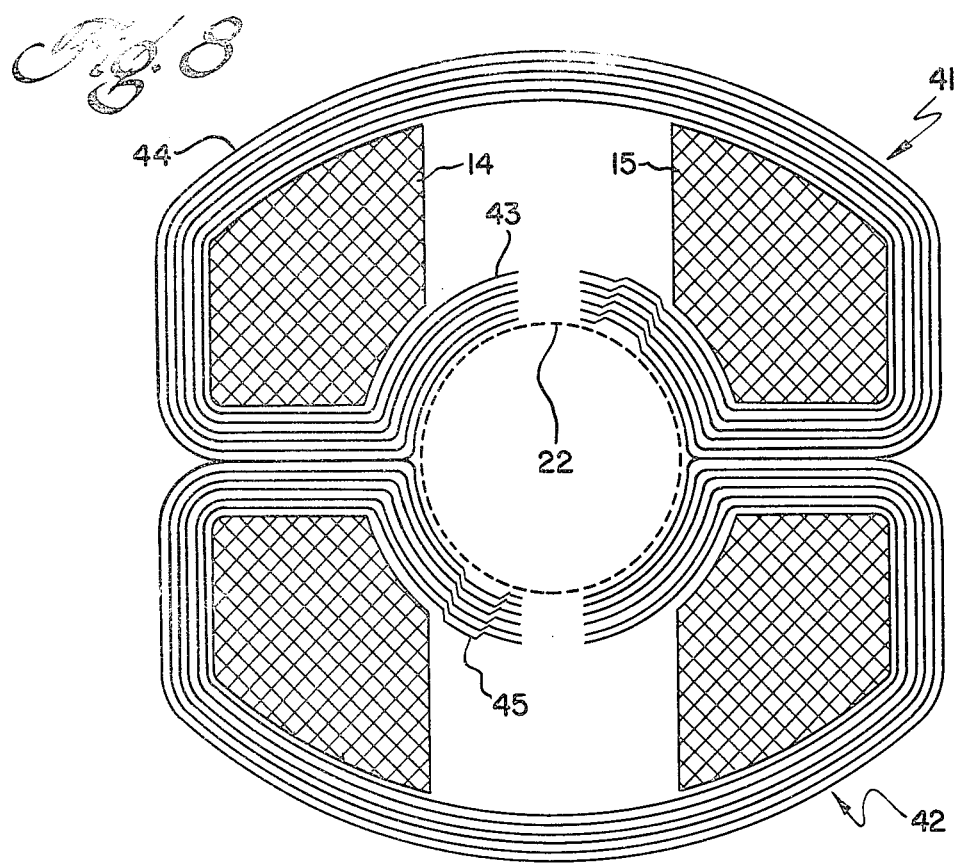
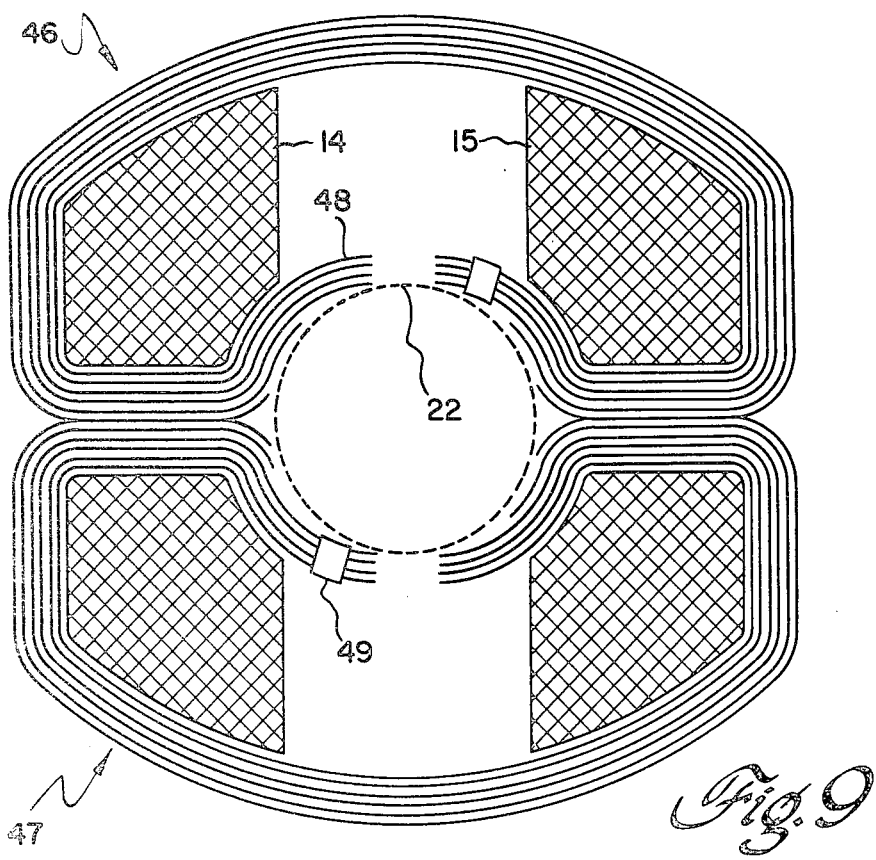

LAMINATED MOTOR STATOR STRUCTURE WITH MOLDED COMPOSITE POLE PIECES

BACKGROUND OF THE INVENTION

This invention relates to stators for electric motors and especially to stators having laminated cores made from both metallic strip and moldable magnetic composite material, or with metallic strip alone, that are configured for simple assembly.

Amorphous metal is also known as metallic glass and exists in many different compositions including a variety of magnetic alloys. For power applications amorphous metal core material is promising because of the combination of potential low cost and low magnetic losses, which are as little as one-fourth the losses in silicon steel. Current and anticipated near-future capability of amorphous metal materials is limited to thin, narrow strip or tape and to flakes or filaments. These do not lend themselves to conventional motor structures which utilize relatively large flat laminations. Flat motor laminations are produced by punching from sheet and requires substantial investment in equipment; moreover, there is an appreciable amount of scrap that is not easily recycled into usable material. Insertion of electrical windings into the stator core in coventional constructions usually involves winding of coils in place or considerable careful insertion work either by hand or by complex machines.

Various suggestions have been made for fashioning amorphous metal ribbon into magnetic structures for electric machines and inductive components, and among these are U.S. Pat. No. 4,155,397, V. B. Honsinger and R. E. Tompkins, "Method and Apparatus for Fabricating Amorphous Metal Laminations for Motors and Transformers", and application Ser. No. 966,855 filed on Dec. 6, 1978, R. P. Alley and R. E. Tompkins, "Amorphous Metal Ballasts and Reactors". The foregoing and other copending applications are all assigned to the instant assignee. The motor stator structures according to this invention advantageously employ amorphous tape and flake but may utilize other materials with similar magnetic characteristics.

SUMMARY OF THE INVENTION

A laminated stator core for dc and ac motors with concentrated windings and an even number of poles is comprised of a like number of substantially identical core sections that are constructed of nested layers of continuous flat metallic strip bent to have a pair of straight legs which are connected by a yoke member. This coil section structure in conveniently realized by winding a long length of strip as a spool of tape is wound and cutting out a piece. The core sections are assembled coplanar to one another to yield a magnetic structure with inwardly projecting contacting pairs of straight legs, which are the stator poles. A concentrated stator winding, which can be a separately wound coil, is inserted onto each pole, and a molded magnetic composite pole piece with a curved air gap surface is mounted on and holds together every contacting pair of core straight legs. The strip material is amorphous metal tape and the magnetic composite material is amorphous flake or filament in a binder. Other magnetic materials of similar characteristics such as steel strip and ferrous particles in a binder may also be used.

The preferred embodiment is a two pole or shaped pole motor stator with two roughly "C" shaped core sections, and a four pole motor stator has four pie-shaped core sections. Both are readily assembled; complex pole face geometries are easily produced in molded material; laminations follow the magnetic flux paths closely; and maximum flux densities are accommodated readily by the laminated back structure while lesser densities near the air gap are handled easily by the molded material.

Additional configurations utilize only the tape or strip material, and in these the two-part pole pieces are produced by bending the laminated structure or by fanning out the layers.

BRIEF DESCRIPTION OF THE DRAWINGS

FIGS. 8 and 9 are side views of motors in which the pole pieces are produced by bending the amorphous strip and by fanning out the strip.

DESCRIPTION OF THE PREFERRED EMBODIMENTS

Simply assembled and potentially low cost motor stator structures are fabricated using metallic strip or tape and moldable magnetic composite material. The strip or tape material is wound in a manner to provide a laminated core structure to carry magnetic flux, and the moldable material is used to form the shape required for the pole pieces and the precise dimensions and shape of the air gap between stator and rotor. Concentrated electrical windings can be inserted between the strip winding and molding operations. The strip is magnetic amorphous metal tape and the molded material is amorphous metal flake or filament composite. Other materials of similar magnetic characteristics, such as magnetic steel strip and iron powder composite, may also be used in the same arrangement. This construction is applicable to dc and ac induction, permanent magnet synchronous and hystereis motors, or any other motor type which requires this sort of flux carrying structure.

Figure 1:
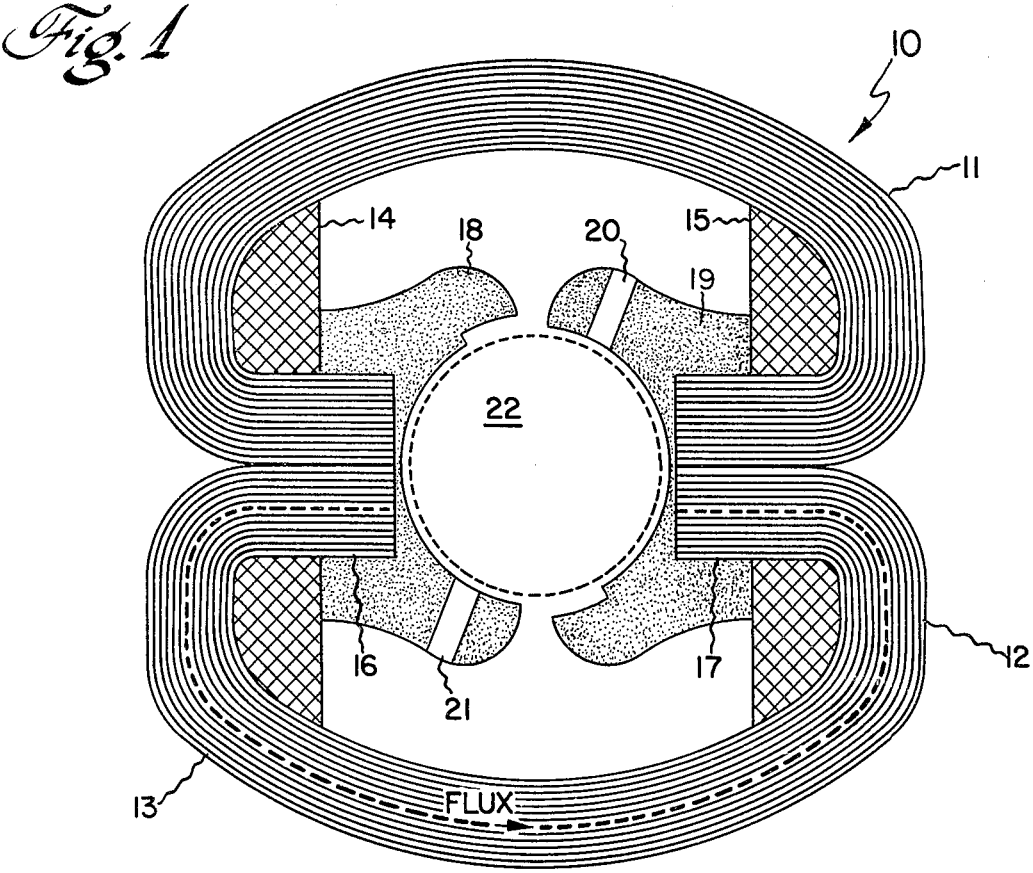
FIGS. 1 and 2 are side and top views of a two pole motor constructed with amorphous metal tape and molded amorphous composite.
Figure 2:
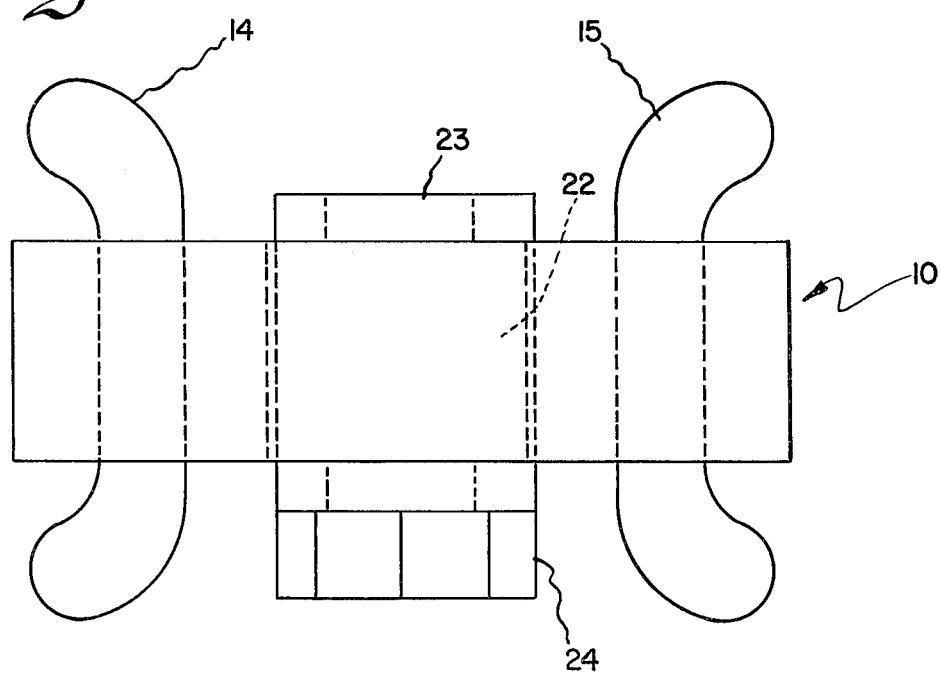

The typical two pole motor in FIGS. 1 and 2 is a single phase shaped pole ac induction motor with a stator structure manufactured from amorphous metal tape and composite. The stator has a laminated core indicated generally at 10 comprised of a pair of roughly "C" shaped core sections or yoke structures 11 and 12, each constructed of nested layers of continuous flat amorphous strip 13. The two core sections are assembled coplanar to one another with their inwardly projecting straight legs in contact, and stator coils 14 and 15 are mounted on and surround these two opposing poles 16 and 17. Amorphous composite pole pieces 18 and 19, after insertion of the windings, are molded onto and hold together the assembly and contacting pairs of core straight legs. Metal rings 20 and 21 are molded in place at opposing ends of the pole pieces and are the shading coils. The rotor is a conventional squirrel cage rotor 22 and the end rings 23 and fan 24 are visible in FIG. 2.

Amorphous metal ribbon has a thickness of 2 mils or less and is prepared by rapid quenching of a stream of molten alloy on a rotating chill cylinder. The thickness limitation is set by the rate of heat transfer through the already solidified material, which must be rapid enough that the last increment of material to solidify still avoids crystallization. This is several times thinner than currently used lamination materials. Ribbon widths on the order of one-half inch to one inch are available and wider widths of two inches to four inches have been mentioned. A high flux density magnetic alloy such as $Fe_{82}B_{15}Si_3$ is preferred. Other suitable compositions are $Fe_{80}B_{20}$ and $Fe_{40}Ni_{40}P_{14}B_6$, among many others.

Figure 3:
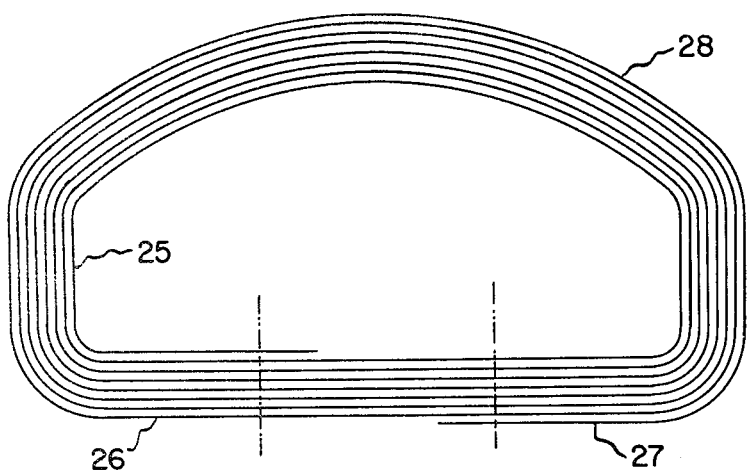
FIG. 3 illustrates a wound "D" core with dashed lines to indicate where the straight leg is cut.

Referring to FIG. 3, core sections 11 and 12 are fabricated by winding a long length of amorphous tape 25 in a "D" shape to form the yoke structure, then the center of one leg of the "D" is cut at the dashed lines to yield core straight legs 26 and 27 and create space between them to admit the rotor end poles pieces. The part of the laminated core section between straight legs 26 and 27 is referred to as generally curved yoke member 28. The separately wound stator coils have a square or rectangular hole and are easily slipped over the contacting straight legs of the assembled core sections preformed shading coils are placed, and the pole piece structures are injection molded in place from amorphous composite.

The moldable composite material is amorphous metal flakes, filaments, or segments in a binder such as epoxy, as taught in copending application now Ser. No. 954,197 filed on Oct. 24, 1978, now U.S. Pat. No. 4,197,146, P. G. Frishmann, "Molded Amorphous Metal Electrical Magnetic Components"; and in copending application Ser. No. 018,933 filed on Mar. 9, 1979, R. E. Tompkins, "Cast Inductive Circuit Components". Both of these are assigned to the same assignee as this invention. The filament material is long and narrow with a length of about one-quarter inch or less and is evenly dispersed within the binder. The curved air gap surface of the pole piece, which is relieved at one end as shown in FIG. 1, is easily manufactured by injection molding.

Figure 4:
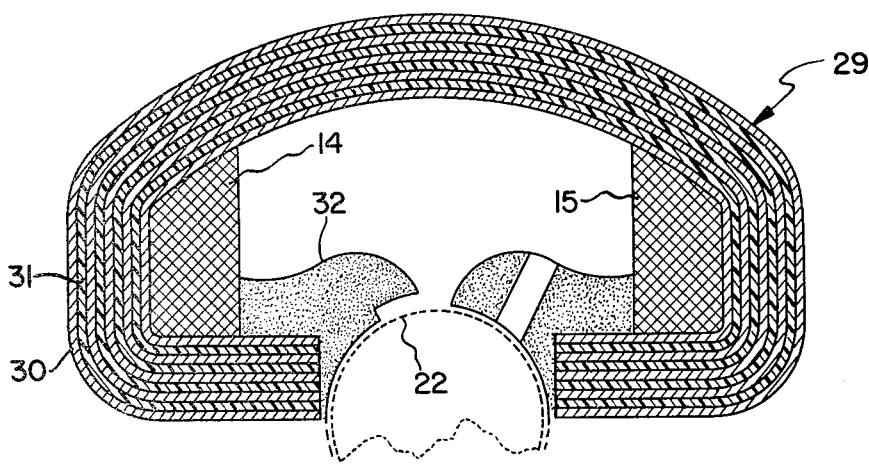
FIG. 4 is a side view partly in cross section of one-half of a motor using steel strip and molded iron powder composite.

The stator structure for a two pole motor can also be fabricated using magnetic steel strip and moldable iron powder composite. Whereas amorphous tape is relatively thin and can be wound directly in contact without insulation between the layers, laminations of steel strip are substantially thicker and are coated with varish or other insulating material. In FIG. 4, core section 29 is constructed of bent, nested layers of steel or other metal strip 30 alternated with insulating layers 31. After assembly of the laminated yoke structures and stator coils, pole pieces 32 are molded in place from a composite material having iron powder or other ferrous particles such as steel filings in a bonding matrix.

There are a number of advantages of this construction technique and motor configuration. Laminations follow flux paths closely (the flux path in core section 12 is indicated in dashed lines in FIG. 1) and a minimum of parasitic air gaps are introduced. Assembly is relatively simple and easy and the technique is applicable to dc machines and all concentrated winding ac machines. Complex pole face or air gap geometries are easily produced in molded material. Maximum flux densities are accommodated in the back structure where this is desirable in material saving, while lesser densities in the more complex region near the air gap are easily handled by the molded material. Finally, no punching operations are required on difficult or precise shapes.

Figure 5:
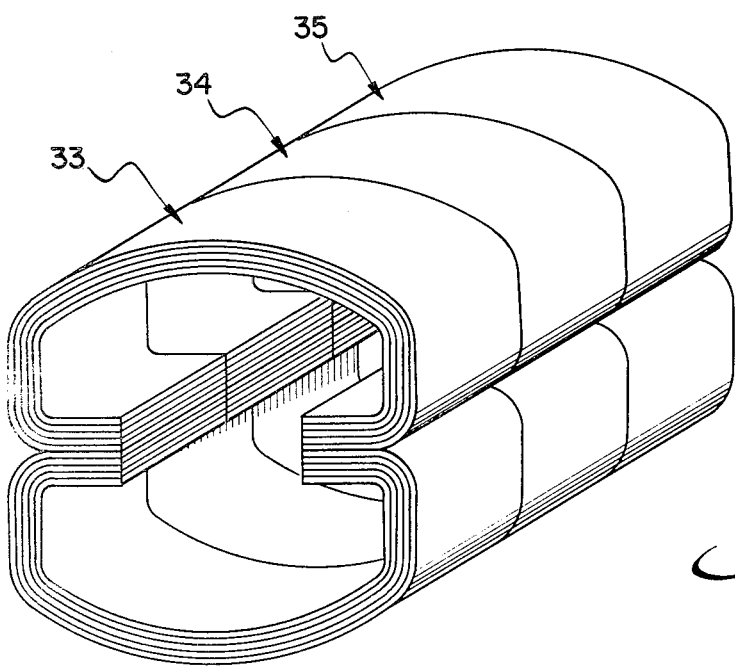
FIGS. 5 and 6 are perspective and top views of a longer stator core realized by adding core sections lengthwise and of a larger motor with the long core.
Figure 6:
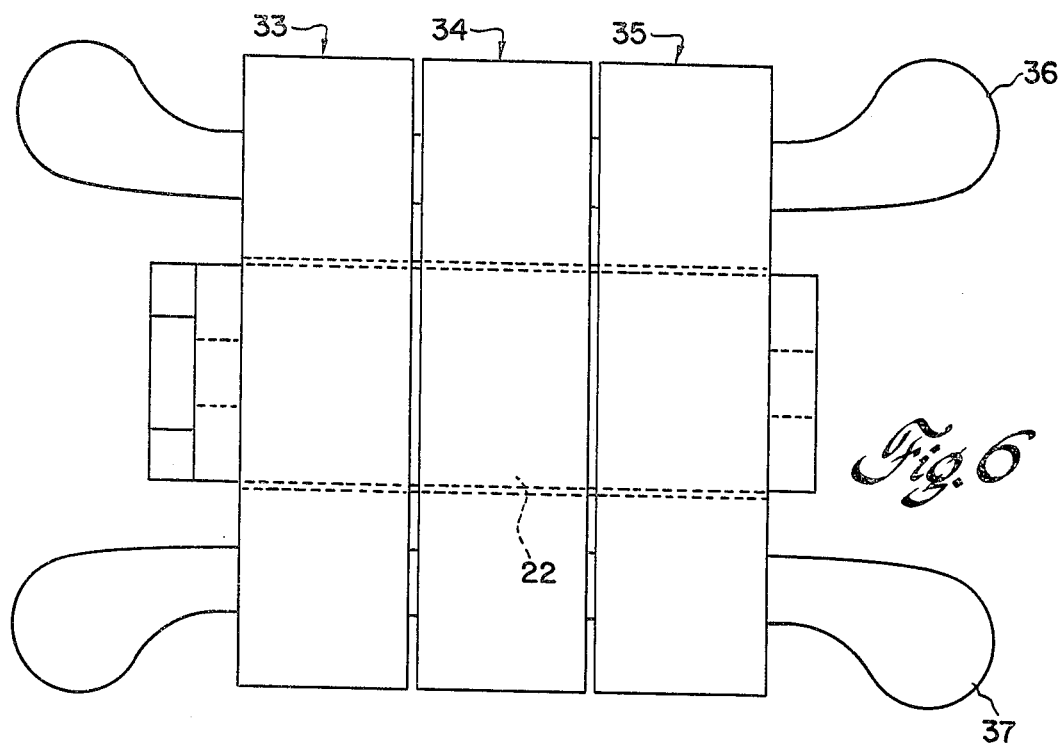

If longer stator structures are needed than can be realized with available widths of amorphous metal tape, longer stacks can be made by adding up pieces lengthwise. Referring to FIGS. 5 and 6, two-piece laminated stator cores 33, 34, and 35 are stacked against one another and stator coils 36 and 37 are inserted onto the aligned poles structures, or contacting pairs of core straight legs of the several laminated cores. The two molded amorphous composite pole pieces hold together the entire assembly of windings and core sections.

Figure 7:
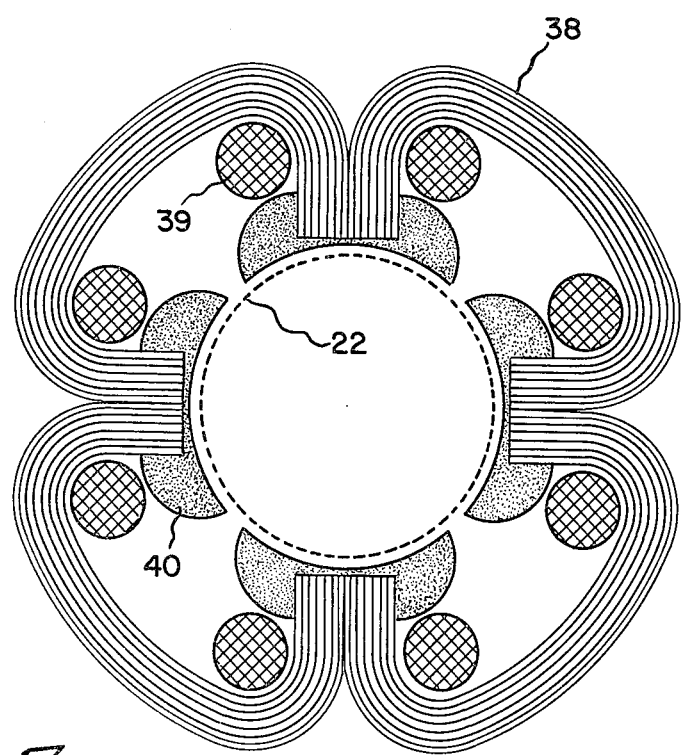
FIG. 7 is a side view of a four pole machine similar to FIG. 1.

Stator structures for four, six, or more poles are made in similar manner, and in this case the wound core sections or yoke structures are shaped like pie pieces before cutting off the unwanted portions. FIG. 7 shows a four pole motor stator assembled from four core section quadrants 38, concentrated windings 39, and molded composite pole pieces 40. Either amorphous or conventional magnetic materials may be utilized for the metallic strip and composite.

The pole pieces can alternately be produced by bending the laminated tape structure as shown in FIG. 8, or by fanning it out as shown in FIG. 9. Both are two poles motors with provision for shading coils. Laminated core sections 41 and 42, FIG. 8, have arc-shaped pole piece extensions 43 at either end of the core straight legs that curve in the same direction toward central yoke member 44. These are referred to as two-part pole pieces, one part being on core section 41 and the other part on core section 42. Notches 45 in the amorphous tape at opposing ends of the pole pieces serve to receive the shading coils. In FIG. 9, core sections 46 and 47 have fanned out pole piece extensions 48 at either end of the core straight legs. These are also two-part pole piece structures. Stator coils 14 and 15 are wound in place, after assembling together the two core sections, by conventional coil winding machines. Shading coil rings 49 are inserted over opposing ends of the pole pieces. For these embodiments in which the magnetic structure is fabricated from only metallic strips, either amorphous tape or magnetic steel strip may be the magnetic material.

While the invention has been particularly shown and described with reference to several preferred embodiments thereof, it will be understood that various changes in form and details may be made therein by those skilled in the art without departing from the spirit and scope of the invention.

The invention claimed is:
1. A motor stator comprising:
   a laminated stator core comprised of substantially identical core sections each constructed of nested layers of flat metallic strip bent to have a pair of straight legs and a connecting yoke member, said core sections being assembled coplanar to one another to be a magnetic structure with an even number of inwardly projecting contacting pairs of straight legs which are the poles;
   a concentrated stator coil surrounding every such contacting pair of core straight legs; and
   a magnetic composite pole piece molded onto every contacting pair of core straight legs, said composite pole pieces having curved air gap surfaces and holding together the assembly of said core sections and stator coils.

2. The stator of claim 1 wherein said metallic strip is amorphous metal tape and the nested layers of tape are in contact, and said magnetic composite is amorphous metal flake or filament in a binder.

3. The stator of claim 1 wherein plural laminated stator cores are stacked together, each stator coil surrounds the aligned contacting pairs of core straight legs of all of said laminated cores, and said magnetic composite pole pieces hold together the entire assembly.

4. A stator for a two pole motor comprising:

a laminated stator core comprised of two substantially identical core sections each constructed of nested layers of continuous flat metallic strip bent to have a pair of opposing straight legs that are connected by a generally curved yoke member, said core sections being assembled coplanar to one another to be a magnetic structure with two inwardly projecting contacting pairs of straight legs which are the poles;

a pair of concentrated stator coils each surrounding one of said contacting pair of core straight legs;

a pair of magnetic composite pole pieces each of which has a curved air gap surface and is molded onto one of said contacting pair of core straight legs, said pole pieces holding together the assembly of said core sections and stator coils; and a shading coil ring on each pole piece.

5. The stator of claim 4 wherein said metallic strip is amorphous metal tape and said magnetic composite is amorphous flake or filament in a binder.

* * * * *